US006135497A

United States Patent [19]

Sutherland et al.

[11] Patent Number: 6,135,497

[45] Date of Patent: Oct. 24, 2000

[54] VEHICLE OCCUPANT PROTECTION APPARATUS

[75] Inventors: Daniel R. Sutherland, Sterling Heights; Michael James White, Jr., Shelby Township; Robert I. Phillion, Ray Township, all of Mich.

[73] Assignee: TRW Vehicle Safety Systems Inc., Lyndhurst, Ohio

[21] Appl. No.: 09/106,650

[22] Filed: Jun. 29, 1998

[51] Int. Cl.$^{7}$ .................................................... B60R 21/06

[52] U.S. Cl. ........................... 280/749; 280/748; 296/152

[58] Field of Search .................................... 280/748, 749; 296/152

[56] References Cited

U.S. PATENT DOCUMENTS

| | | | |
|---|---|---|---|
| 1,936,251 | 11/1933 | McCullough | 280/749 |
| 2,477,933 | 8/1949 | Labser | 280/749 |
| 3,037,809 | 6/1962 | Praha | 280/749 |
| 3,909,038 | 9/1975 | McDonnell | 280/748 |
| 4,215,895 | 8/1980 | Phillips | 296/202 |
| 4,657,105 | 4/1987 | Miyada | 180/274 |
| 5,232,244 | 8/1993 | Itoh | 280/749 |
| 5,290,086 | 3/1994 | Tucker | 296/152 |
| 5,322,322 | 6/1994 | Bark et al. | 280/730.2 |
| 5,333,898 | 8/1994 | Stutz | 280/730.2 |
| 5,462,308 | 10/1995 | Seki et al. | 280/749 |
| 5,536,042 | 7/1996 | Williams et al. | 280/749 |
| 5,588,672 | 12/1996 | Karlow et al. | 280/730.2 |
| 5,599,042 | 2/1997 | Shyr et al. | 280/730.1 |
| 5,660,414 | 8/1997 | Karlow et al. | 280/749 |
| 5,707,075 | 1/1998 | Kraft et al. | 280/730.2 |
| 5,713,624 | 2/1998 | Tower | 296/152 |
| 5,788,270 | 8/1998 | Haland et al. | 280/729 |

FOREIGN PATENT DOCUMENTS

| | | | |
|---|---|---|---|
| 2297950 | 8/1996 | United Kingdom | 280/730.2 |

*Primary Examiner*—J. J. Swann
*Assistant Examiner*—L. Lum
*Attorney, Agent, or Firm*—Tarolli, Sundheim, Covell, Tummino & Szabo L.L.P.

[57] ABSTRACT

An apparatus (10) includes a vehicle occupant protection curtain (12) which is movable from a retracted position to a deployed position extending across a vehicle window (15). The apparatus (10) further includes a track (44 or 48) and a runner (34). The runner (34) is connected to the curtain (12) to draw the curtain (12) from the retracted position to the deployed position upon movement of the runner (34) along the track (44 or 48) from a first position to a second position. The track (44 or 48) defines a plurality of intermediate positions to which the runner (34) is movable transversely of the track (44 or 48) in a direction toward the window (15). The track (44 or 48) blocks return movement of the runner (34) from each of the intermediate positions toward the initial position under the influence of tension imparted to the curtain (12) by a vehicle occupant moving against the curtain (12) in a direction outward of the window (15).

4 Claims, 2 Drawing Sheets

VEHICLE OCCUPANT PROTECTION APPARATUS

FIELD OF THE INVENTION

The present invention relates to a vehicle occupant protection apparatus including a curtain for restraining movement of a vehicle occupant upon the occurrence of a crash.

BACKGROUND OF THE INVENTION

Vehicle crash forces may tend to move an occupant of a vehicle toward a vehicle window. For example, side impact crash forces and rollover crash forces may tend to move a vehicle occupant toward a window at the side of the vehicle. Front impact and rear impact crash forces may tend to move an occupant of a front seat toward the windshield, and may tend to move an occupant of a rear seat toward the rear window. Therefore, a vehicle may be equipped with a curtain for restraining movement of an occupant toward a window under the influence of vehicle crash forces.

SUMMARY OF THE INVENTION

In accordance with the present invention, an apparatus comprises a vehicle occupant protection curtain which is movable from a retracted position to a deployed position extending across a vehicle window. The apparatus further comprises a track and a runner. The runner is connected to the curtain to draw the curtain from the retracted position to the deployed position upon movement of the runner along the track from a first position to a second position.

The track defines a plurality of intermediate positions to which the runner is movable transversely of the track in a direction toward the window. The track blocks return movement of the runner from each of the intermediate positions toward the initial position under the influence of tension imparted to the curtain by a vehicle occupant moving against the curtain in a direction outward of the window.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
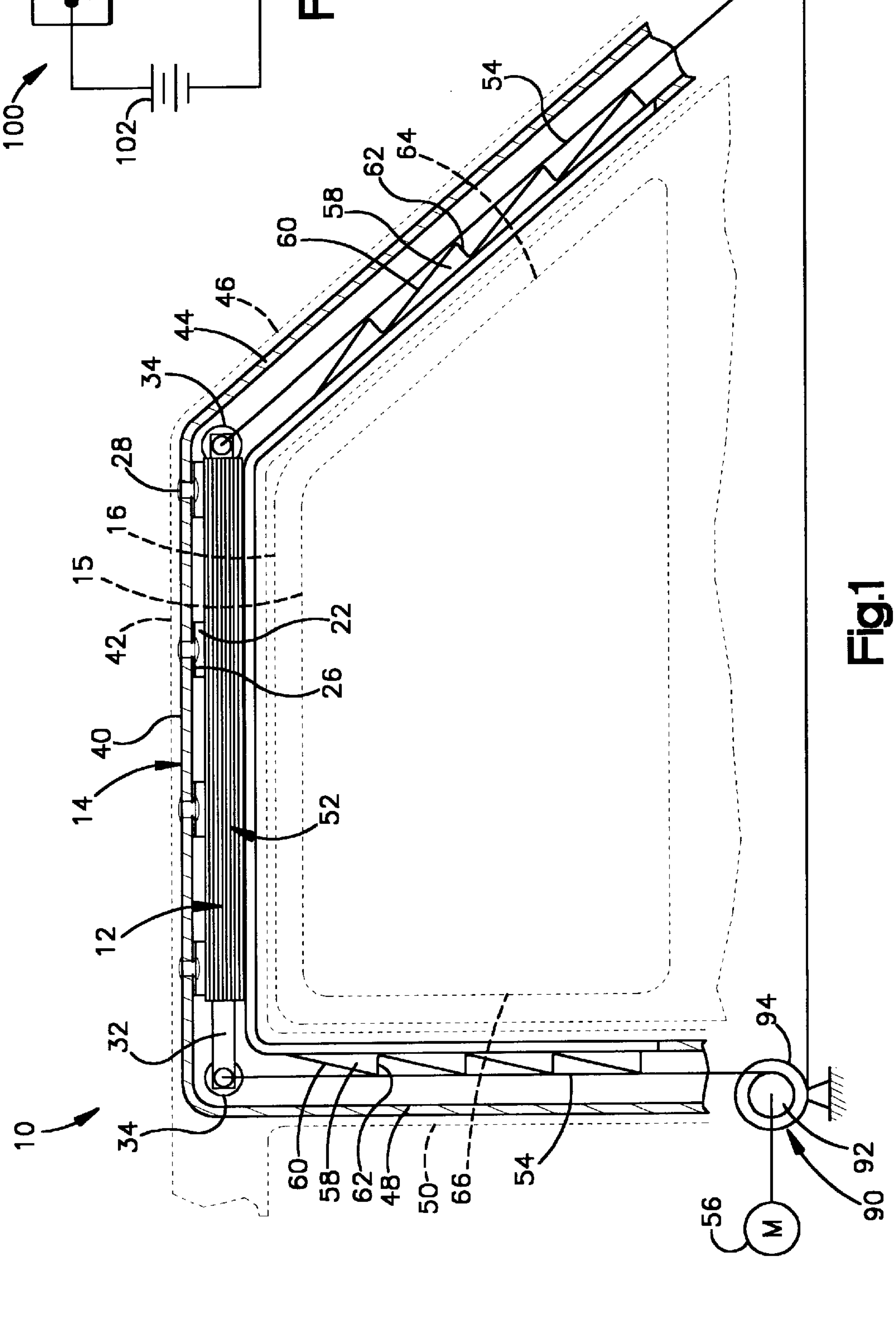
FIG. 1 is a side view of an apparatus comprising a preferred embodiment of the present invention.
Figure 2:
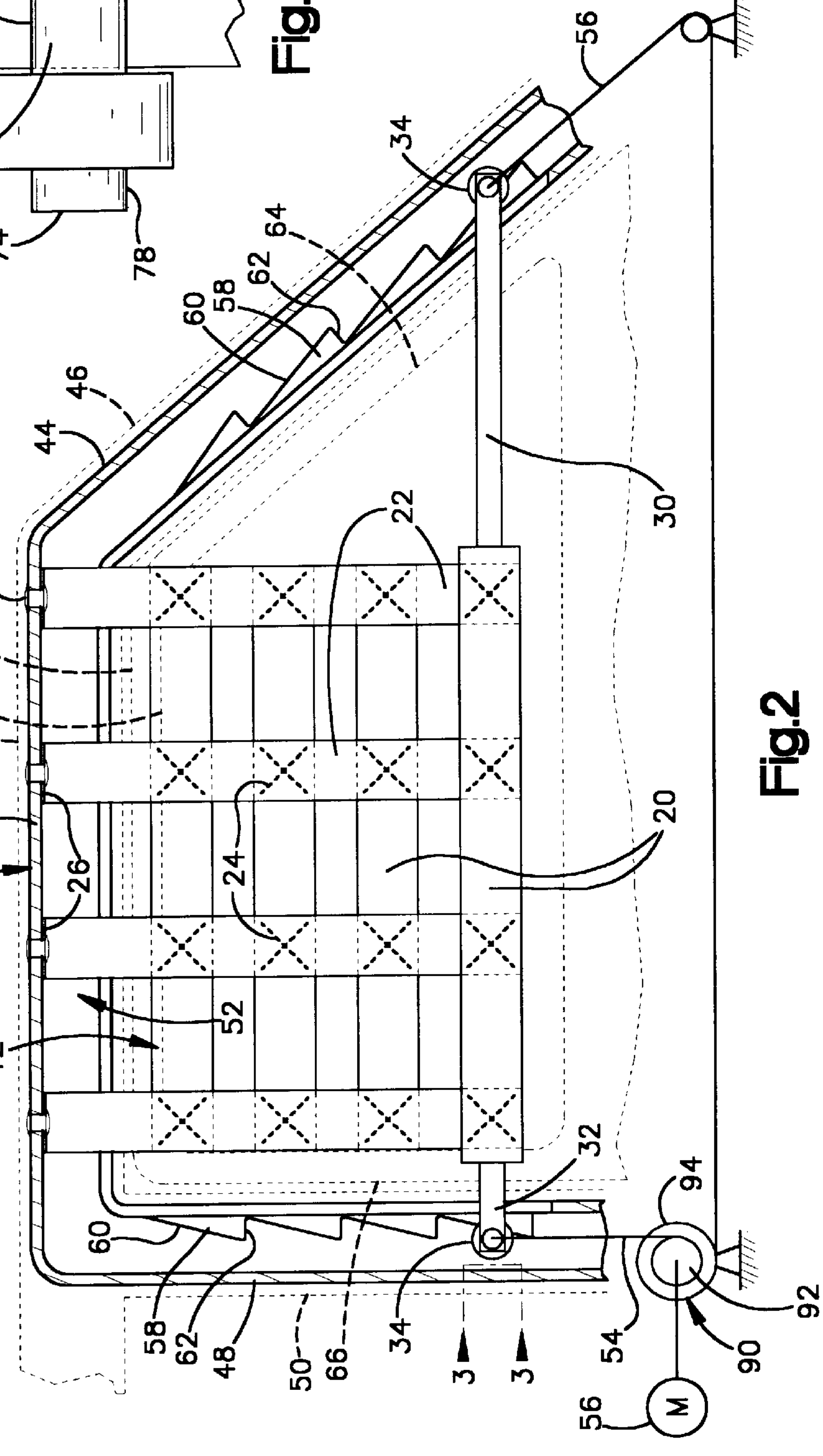
FIG. 2 is a view similar to FIG. 1 showing parts in different positions.

An apparatus 10 comprising a preferred embodiment of the present invention is shown partially in FIGS. 1 and 2. The apparatus 10 includes a particular type of vehicle occupant protection device 12 which is known as a side curtain. The apparatus 10 further includes a frame 14 which extends along three sides of a window 15 in a door 16 (shown schematically) at the side of a vehicle. The frame 14 supports the curtain 12 for movement from a retracted position, as shown in FIG. 1, to a fully deployed position, as shown in FIG. 2, upon the occurrence of a vehicle crash. When the curtain 12 is in the fully deployed position, it extends across the window 15 to help restrain movement of a vehicle occupant in a direction outward of the window 15. In accordance with the present invention, the frame 14 blocks the curtain 12 from moving back toward the retracted position when a vehicle occupant moves against the curtain 12.

As shown in FIG. 2, the curtain 12 in the preferred embodiment of the present invention comprise a grid of horizontally and vertically extending straps 20 and 22. The straps 20 and 22 may be formed of any suitable material known in the art, such as seat belt webbing, and are interconnected by stitched seams 24 that attach each pair of intersecting straps 20 and 22 together. The vertically extending straps 22 have upper end portions 26 which together define the top of the curtain 12. A corresponding plurality of rivets 28 fix the upper end portions 26 of those straps 22 to the frame 14. A pair of tethers 30 and 32 are attached to the opposite ends of a horizontally extending strap 20 at the bottom of the curtain 12. The tethers 30 and 32 extend horizontally from the bottom strap 20 to a pair of runners 34 on the frame 14.

As shown schematically in FIGS. 1 and 2, the frame 14 in the preferred embodiment of the present invention is mounted on the vehicle separately from the door 16. Specifically, the frame 14 has a top section 40 which is mounted on the roof structure 42 of the vehicle. A front section 44 of the frame 14 is mounted on an A-pillar 46. A rear section 48 of the frame 14 is mounted on an adjacent B-pillar 50.

The top section 40 of the frame 14 defines a storage compartment 52 in which the curtain 12 is folded and stored in the retracted position of FIG. 1. The front and rear sections 44 and 48 of the frame 14 are tracks along which the runners 34 are movable from initial positions, as shown in FIG. 1, to final positions, as shown in FIG. 2. As described more fully below, a pair of driving lines 54 are connected to the runners 34 to pull the runners 34 downward along the tracks 44 and 48 under the driving force of a motor 56. When the runners 34 are pulled downward from their initial positions to their final positions, they draw the curtain 12 downward from the retracted position to the fully deployed position.

Each of the tracks 44 and 48 has a saw-tooth configuration with a plurality of longitudinally extending teeth 58. Each tooth 58 has a ramp surface 60 and a lower end surface 62. The ramp surfaces 60 on the teeth 58 in the front track 44 are inclined downward in directions extending forward from the front end 64 of the window 15. In a generally opposite configuration, the ramp surfaces 60 on the teeth 58 in the rear track 48 are inclined downward in directions extending rearwardly from the rear end 66 of the window 15.

Figure 3:
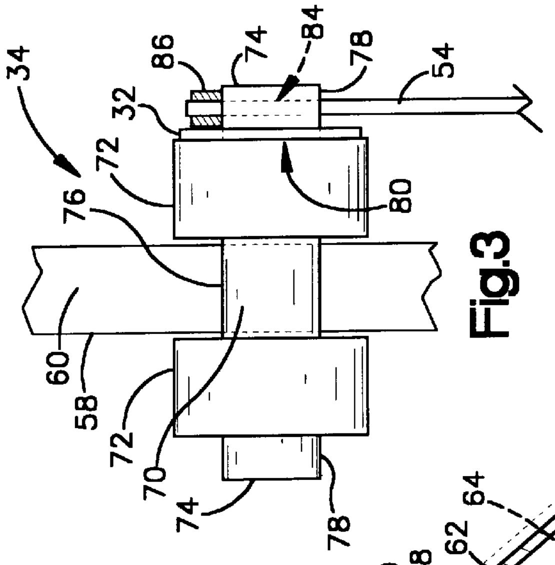
FIG. 3 is a view taken on line 3—3 of FIG. 2.

The runners 34 are alike. As shown in FIG. 3, each runner 34 is a spool-shaped part having a cylindrical shaft 70 and a pair of annular flanges 72. The flanges 72 project radially outward of the shaft 70 at locations that are axially spaced apart between the opposite ends 74 of the shaft 70. The shaft 70 thus has a central section 76 extending axially between the flanges 72, and further has a pair of opposite end sections 78 extending axially outward from the flanges 72. The flanges 72 retain the runners 34 on the teeth 58 in the tracks 44 and 48, with the central sections 76 of the shafts 70 extending across the ramp surfaces 60 on the teeth 58.

As further shown in FIG. 3, one end section 78 of each shaft 70 is received through a circular opening 80 in the adjacent tether 30 (or 32). That end section 78 of the shaft 70 has a diametrically extending passage 84 receiving the corresponding driving line 54. The driving line 54 is retained in the passage 84 by a crimped retainer ring 86.

As shown schematically in FIGS. 1 and 2, the driving lines 54 are wound on a reel 90. The driving line 54 at the rear track 48 is connected to a first spool 92 on the reel 90. The driving line 54 at the front track 44 is connected to a second, larger diameter spool 94 on the reel 90. When the reel 90 rotates in the clockwise direction, as viewed in FIG. 1, it winds the driving lines 54 onto the spools 92 and 94 so as to pull the runners 34 downward together along the tracks 44 and 48.

Figure 4:
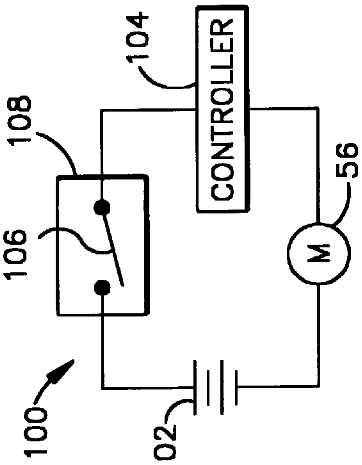
FIG. 4 is a block diagram of parts of the apparatus of FIG. 1.

The motor 56 is connected in an electrical circuit 100 (FIG. 4) with a power source 102, a controller 104, and a normally open switch 106. The power source 102 preferably comprises the vehicle battery and/or a capacitor. The switch 106 is part of a sensor 108 which senses vehicle conditions indicating the occurrence of a crash. Such a condition may meet or exceed a predetermined level of severity for which deployment of the curtain 12 is desired to help protect an occupant of a vehicle. The switch 106 then closes and the controller 104 directs electric current through the motor 56 to actuate the motor 56. Specifically, the controller 104 directs the motor 56 to rotate the reel 90 an amount that causes the driving lines 54 to pull the runners 34 downward along the tracks 44 and 48 fully from their initial positions to their final positions.

When the motor 56 is actuated in the foregoing manner, the runners 34 will ordinarily draw the curtain 12 downward across the window 15 from the initial position of FIG. 1 to the fully deployed position of FIG. 2. As indicated by the orientations of the driving lines 54 in FIG. 1, the runners 34 follow paths of movement that extend short distances along the ramp surfaces 60 near the crests of the teeth 58 successively along the tracks 44 and 48. However, crash forces may cause a vehicle occupant to move against the curtain 12 in a direction outward of the window 15 before the curtain 12 reaches the fully deployed position. Such movement of the occupant against the curtain 12 deflects the curtain 12 outward of the window 15, and thus imparts tension to the horizontally extending straps 20. A corresponding amount of tension is imparted to the tethers 30 and 32 that extend horizontally from the bottom strap 20 to the runners 34. This causes the tethers 30 and 32 to pull the runners 34 transversely of the tracks 44 and 48 in opposite directions toward the front and rear ends 64 and 66 of the window 15. The ramp surfaces 60 adjacent to the runners 34 then direct the runners 34 upward toward lower end surfaces 62 of the teeth 58 immediately above the runners 34. The central sections 76 (FIG. 3) of the shafts 70 on the runners 34 are thus received directly beneath the lower end surfaces 62 of the teeth 58 so that the lower end surfaces 62 can block further movement of the runners 34 back upward along the tracks 44 and 48. The curtain 12 is thus restrained from moving back upward toward the retracted position of FIG. 1 under the influence of vehicle crash forces applied to the curtain 12 by a vehicle occupant.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a vehicle occupant protection curtain being movable from a retracted position to a deployed position which extends across a vehicle window;

a track; and a runner being connected to said curtain to draw said curtain from said retracted position to said deployed position upon movement of said runner along said track from a first position to a second position;

said track having a saw-tooth configuration with a plurality of teeth, each of said teeth having a ramp surface which defines a plurality of intermediate positions, each of said intermediate positions being formed from a lower end surface of each tooth, said intermediate positions being configured to block return movement of said runner toward said first position when tension is imparted on said curtain by a vehicle occupant moving against said curtain in a direction outward of said window.

2. Apparatus as defined in claim 1 further comprising a motor drivingly connected to said runner so as to drive said runner from said first position to said second position.

3. Apparatus as defined in claim 1 wherein said curtain comprises a grid of intersecting straps.

4. Apparatus as defined in claim 1 wherein said runner is connected to said curtain by a tether extending horizontally from said runner to one of said straps.

* * * * *